(12) United States Patent
Yajima et al.

(10) Patent No.: US 9,031,533 B2
(45) Date of Patent: May 12, 2015

(54) MOBILE TERMINAL, AND PROGRAM AND METHOD FOR PREVENTING UNAUTHORIZED USE OF MOBILE TERMINAL

(75) Inventors: Akira Yajima, Tokyo (JP); Naotake Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 1703 days.

(21) Appl. No.: 12/131,305

(22) Filed: Jun. 2, 2008

(65) Prior Publication Data

US 2008/0305771 A1 Dec. 11, 2008

(30) Foreign Application Priority Data

Jun. 6, 2007 (JP) ................................. 2007-151007

(51) Int. Cl.
*H04M 1/66* (2006.01)
*H04M 1/02* (2006.01)

(52) U.S. Cl.
CPC .............. *H04M 1/66* (2013.01); *H04M 1/0245* (2013.01); *H04M 2250/12* (2013.01)

(58) Field of Classification Search
CPC ..... H04W 12/12; H04W 12/08; H04W 8/245; H04W 4/021; H04W 4/025; H04W 64/00; H04W 12/06; H04W 12/00; H04W 48/02; H04W 48/04; H04W 4/22; H04W 4/04; H04W 24/10; H04W 48/08; H04W 4/001; H04W 4/026; H04W 4/027; H04M 2250/12; H04M 1/72522; H04M 1/66; H04M 1/673

USPC ........ 455/552.1, 410, 411, 414.1, 414.4, 418, 455/419, 423; 340/5.54, 5.73, 7.58; 700/215; 379/114.14

See application file for complete search history.

(56) References Cited

U.S. PATENT DOCUMENTS

| | | | |
|---|---|---|---|
| 2004/0123161 A1* | 6/2004 | Harada et al. .................. | 713/202 |
| 2005/0170813 A1* | 8/2005 | Choi .............................. | 455/411 |
| 2006/0234764 A1* | 10/2006 | Gamo et al. ................ | 455/552.1 |
| 2007/0254697 A1* | 11/2007 | Sugio et al. ................. | 455/556.2 |
| 2008/0201277 A1* | 8/2008 | Ozdemir et al. ................ | 706/11 |

FOREIGN PATENT DOCUMENTS

| | | |
|---|---|---|
| CN | 1655643 A | 8/2005 |
| CN | 1801631 A | 7/2006 |
| CN | 1855956 A | 11/2006 |
| JP | 11-195030 A | 7/1999 |
| JP | 2001142849 | 5/2001 |

(Continued)

OTHER PUBLICATIONS

Chinese Office Action dated Oct. 18, 2012 issued by the State Intellectual Property Office of P.R. China in corresponding Chinese Patent Application No. 200810110342.3.

*Primary Examiner* — Fred Casca
(74) *Attorney, Agent, or Firm* — Sughrue Mion, PLLC

(57) ABSTRACT

In a mobile terminal having a security function, both convenience and security protection are realized so as to prevent a user from feeling bothersome. A mobile phone has an operation control unit which sets the operation of various functions of the mobile terminal to be unusable at any timing. When a used state determination unit determines that the mobile phone is not in an abnormal state and not left, the operation control unit controls operation of the various functions to maintain usable states.

37 Claims, 12 Drawing Sheets

(56) References Cited

FOREIGN PATENT DOCUMENTS

| JP | 2003-179686 A | 6/2003 |
| JP | 2004-128780 A | 4/2004 |
| JP | 2007013546 | 1/2007 |
| JP | 2007-504714 A | 3/2007 |
| WO | 02103497 | 12/2002 |

* cited by examiner $$a = \sqrt{(a_x)^2 + (a_y)^2 + (a_z)^2}$$

FIG. 3

| | NAME | CURRENT OPERATING STATE | DETERMINATION RESULT |
|---|---|---|---|
| BASE FUNCTION AND LOCAL APPLICATION | OS FUNCTION | UNLOCKED | MAINTAIN UNLOCKED |
| | CALLING FUNCTION | LOCKED | — |
| | PACKET FUNCTION | LOCKED | — |
| | ⋮ | ⋮ | ⋮ |
| | IC CARD FUNCTION | UNLOCKED | TO LOCK |
| | ADDRESS BOOK APPLICATION | UNLOCKED | MAINTAIN UNLOCKED |
| | MAIL APPLICATION | LOCKED | — |
| | SCREEN LOCK | LOCKED | — |
| | ⋮ | ⋮ | ⋮ |
| | BROWSER | UNLOCKED | MAINTAIN UNLOCKED |
| REMOTE APPLICATION | SERVICE(1) | LOGIN | MAINTAIN LOGIN |
| | SERVICE(2) | LOGIN | MAINTAIN LOGIN |
| | JAVA APPLICATION(1) | LOGOUT | — |
| | ⋮ | ⋮ | ⋮ |

FIG. 7

|  | AP SERVICE PATTERN ON NETWORK | TO MAINTAIN LOGIN STATE |
|---|---|---|
| APPLICATION LAYER | JAVA APPLICATION | ACCESS OUTSIDE SERVER BY PREDETERMIND METHOD |
|  | http/https | ACCESS URL OF SERVICE PAGE |
| TRANSPORT LAYER |  | — |
| INTERNET LAYER |  | Ping |
| NETWORK INTERFACE LAYER |  | — |

FIG. 10

| FUNCTION NAME | TO MAINTAIN USABLE STATE | TO MAKE INTO UNUSABLE STATE |
|---|---|---|
| OS FUNCTION | — | ACTIVATE LOCK FUNCTION |
| CALLING FUNCTION | — | PROHIBIT CALLING TO THOSE OTHER THAN DESIGNATED PHONE NO. (DESIGNATED PHONE NO.: 110, 119, HOME) |
| PACKET FUNCTION | — | ACTIVATE LOCK FUNCTION OF PACKET COMMUNICATION |
| ⋮ | ⋮ | ⋮ |
| IC CARD FUNCTION | — | OFF IC CARD SENSOR |
| TELEPHONE BOOK APPLICATION | — | ACTIVATE LOCK FUNCTION |
| MAIL APPLICATION | — | ACTIVATE LOCK FUNCTION |
| SCREEN LOCK | RESET SCREEN LOCK ACTIVATION TIME | ACTIVATE LOCK FUNCTION |
| ⋮ | ⋮ | ⋮ |
| BROWSER | — | CLOSE |
| SERVICE(1) | EXECUTE PING IN X-MINUTE INTERVALS | LOGOFF |
| SERVICE(2) | ACCESS http://yyy.com/login IN Y-MINUTE INTERVALS | ACCESS http://yyy.com/logoff |
| JAVA APPLICATION(1) | AUTHENTICATION PROCESS | CLOSE |
| ⋮ | ⋮ | ⋮ |

MOBILE TERMINAL, AND PROGRAM AND METHOD FOR PREVENTING UNAUTHORIZED USE OF MOBILE TERMINAL

CROSS-REFERENCE TO RELATED APPLICATION

This application is based upon and claims the benefit of priority from Japanese patent application No. 2007-151007, filed on Jun. 6, 2007, the disclosure of which is incorporated herein in its entirety by reference.

BACKGROUND OF THE INVENTION

1. Field of the Invention

The present invention relates to a mobile terminal in which operational settings of various functions thereof can be set to be in unusable states, and a program and a method for preventing unauthorized use of a mobile terminal.

2. Related Art

Mobile terminals such as mobile phones, PHS (Personal Handyphone System), and PDA (Personal Digital Assistant) are now indispensable for realizing ubiquitous society as terminals for utilizing application services on networks including net banking, and as terminals to be used for actual business transactions using electronic money and the like.

Meanwhile, cases that mobile terminals are used in unauthorized states so that the users suffer from mental and economic damages are increasing. As such, mobile terminals are generally provided with various security functions for preventing unauthorized use.

Among various security functions of a mobile terminal, security functions for applications installed therein include a lock mechanism which sets manipulations from outside invalid so that the terminal becomes unusable, and security functions for applications of a mobile terminal for receiving network services include an access control through user authentication using such as an ID and a password.

Regarding a lock mechanism for an application installed in a mobile terminal, timing to lock an application varies. For instance, in the case of a foldable mobile phone, it is locked when the terminal is folded, and in the case of a terminal with a cover for protecting the keys, it is locked when the cover is closed. Further, there are a variety of terminal such as those being locked with operations by the user from a menu screen, those being locked when keys are pressed in a predetermined order, and those being locked automatically if no operation has been performed at the time when several ten seconds to several ten minutes elapsed, as it is determined that the mobile terminal is out of user's control. The locked state activated in this way will be unlocked by performing user authentication using a password and the like.

The procedures of an access control in network services are as follows. That is, a unique ID and a password for a user are transmitted from a mobile terminal to a server of the service provider side and are subjected to user authentication in the server. Upon completion of the user authentication, the server authorizes an access of the mobile terminal, and the mobile terminal logs into a service provided by the server. When the user terminates the use of the service, the connection between the mobile terminal and the server is disconnected, and the mobile terminal logs out. In an assumption that a period from login to logout is a "login state" and a state other than the "login state" is a "logout state", the user can use application services on the network using the mobile terminal during the "login state".

However, even in a mobile terminal with such a security mechanism, it is difficult to determine whether an access using the mobile terminal is performed by an authorized user or by an unauthorized third party in the "unlocked state" or in the "login state". Therefore, the timing to start locking or logout is important in the aforementioned security mechanism.

If the user leaves the mobile terminal in the "login state", a third party may use the service in an unauthorized state with the mobile terminal in the "login state". In order to prevent such unauthorized use, there is an access control to network services, in which the "login state" will be forcibly logged out from the server on the side of providing the network service if no communication is made from the mobile terminal within a predetermined time period.

Further, a mobile terminal including an acceleration sensor or a pressure sensor and having a function of determining the used state thereof based on the observed value of the sensor to thereby start locking or logout according to the determination result is disclosed in International Patent Laid-Open Publication No. WO 2002/103497 (Patent Document 1), and Japanese Patent Laid-Open Publications No. 2007-13546 (Patent Document 2) and No. 2001-142849 (Patent Document 3).

Patent Document 1 discloses a configuration in which an acceleration sensor provided in a mobile terminal accumulates the travel distance of the mobile terminal to measure the cumulative travel distance, and when the cumulative travel distance reaches the reference value, the mobile terminal is locked. Patent Document 2 discloses a configuration in which a sensor provided to a mobile terminal determines an abnormal state of the mobile terminal, and an input by the input device of the mobile terminal is restricted when it is determined to be in an abnormal state. Patent Document 3 discloses a configuration in which a pressure sensor provided to a mobile terminal regularly measures the pressure by the user holding the terminal, and compares the measured pressure with the reference value which is the pressure measured at the time of user authentication so as to prevent unauthorized use of the mobile terminal.

In the above-mentioned security functions, although automatic lock and logout functions, including a lock function which is executed when no operation is performed within a certain time period as being determined that the user left the terminal, and a logout function which is executed forcibly when no communication is made to the server of the network service side for a certain period of time, are excellent for preventing unauthorized use by a third party, they involve a problem that a use by the authorized user may be inconvenient.

For example, in the case of making settlement using an IC card function incorporated in a terminal, even when the IC card function is unlocked, if the user is waiting for purchasing something and a predetermined time period elapses during the waiting time, the IC card function may be locked at the time for the settlement so that the user has to release the lock. There are also the cases that if the user is viewing the same page for a long time so that the predetermined time period elapses without any communication, it is logged out when the user attempts to view the next page, and that if the user is inputting a long message and when he/she attempts to send the message, it is logged out. As described above, the conventional automatic lock or logout function is not user friendly.

SUMMARY OF THE INVENTION

It is an exemplary object of the invention to provide a device, a program, and a method for preventing unauthorized use of functions of a mobile terminal and application services on networks, without forcing a user of the mobile terminal to perform bothersome operation.

In order to achieve the above exemplary object, a mobile terminal according to an exemplary aspect of the invention is a terminal having a lock function for preventing unauthorized use, including an observation processing unit which observes the state of the terminal as a physical quantity, a state determination unit which estimates the state of the terminal based on the physical quantity observed and determines the state of the terminal according to the estimation result, and a functional operation control unit which controls the state of the terminal according to the determination result by the state determination unit.

A program for preventing unauthorized use of a mobile terminal according to another exemplary aspect of the invention is a program which prevents unauthorized use of a mobile terminal having a lock function to prevent unauthorized use, causing a computer to execute a function of observing the state of the terminal as a physical quantity, a function of estimating the state of the terminal based on the physical quantity observed and determining the state of the terminal according to the estimation result, and a function of controlling the state of the terminal according to the determination result by the state determination function.

A method of preventing unauthorized use of a mobile terminal according to still another exemplary aspect of the invention is a method of preventing unauthorized use of a mobile terminal having a lock function, including, observing the state of the terminal as a physical quantity, estimating the state of the terminal based on the physical quantity observed and determining the state of the terminal according to the estimation result, and controlling the state of the terminal according to the determination result.

BRIEF DESCRIPTION OF THE DRAWINGS

FIG. 3 shows operating states of various functions of the mobile phone 1 in the exemplary embodiment shown in FIG. 1;

FIG. 7 shows a list of exemplary operations of the remote application executing function of the mobile phone 1 in the exemplary embodiment disclosed in FIG. 1;

FIG. 10 shows operation control procedures of various functions of the mobile phone 1 in the exemplary embodiment disclosed in FIG. 1;

DESCRIPTION OF EXEMPLARY EMBODIMENTS

An exemplary embodiment of the invention will be described below in detail according to the drawings.

Figure 1:
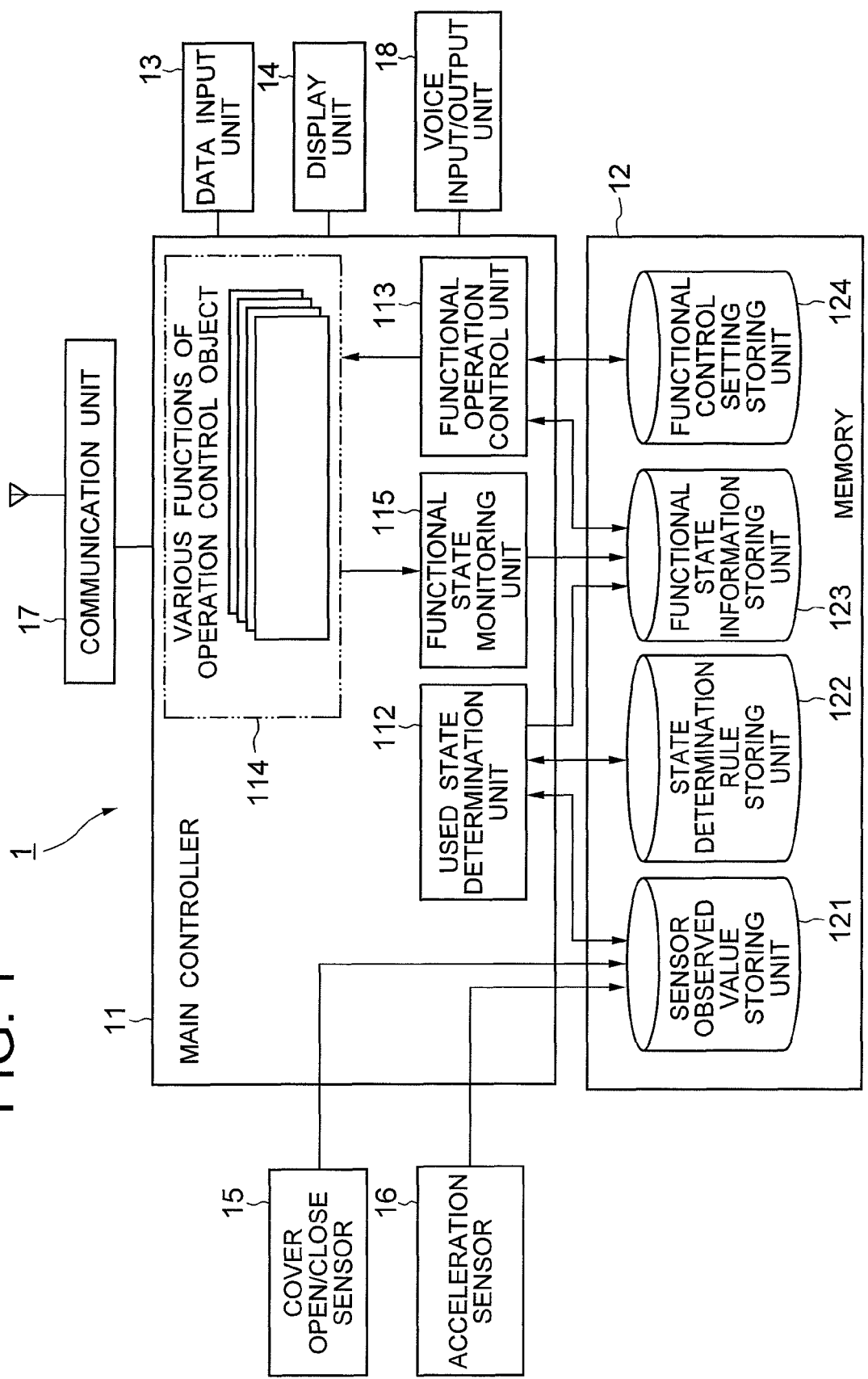
FIG. 1 is a block diagram showing the configuration of a mobile phone 1 according to an exemplary embodiment of the invention.

FIG. 1 is a block diagram showing the configuration of a mobile phone 1 of the exemplary embodiment. Note that although the exemplary embodiment applies the present invention to the mobile phone 1, the present invention may be applied to any mobile terminal having portability such as PDA, laptop PC, POS terminals used by home-delivery companies and the like, and mobile business terminals for such as life insurance, without limiting to mobile phones.

As shown in FIG. 1, the mobile phone 1 of the exemplary embodiment includes a main controller 11 which controls the overall operation of the mobile phone 1, a memory 12 which stores information, a data input unit 13 for inputting information through key operation and the like by a user, a display unit 14 which displays various images on a screen, a cover open/close sensor 15 which detects open/close of a cover for protecting the keys, an acceleration sensor 16 which detects changes in motion acceleration of the mobile phone 1, a communication unit 17 for transmitting and receiving information via wireless link with networks, and a voice input/output unit 18 including a microphone and a speaker used for calling function. The acceleration sensor 16 including the cover open/close sensor 15 configures an observation processing unit which observes the state of the mobile phone (self device) 1 as a physical quantity.

The cover open/close sensor 15 detects whether a cover provided for protecting the keys is open or closed. In this exemplary embodiment, open/close of the cover means, in the case of a folding-type mobile phone, whether it is folded or not, and in the case of a sliding-type mobile phone, whether the keys are exposed by the sliding function.

The acceleration sensor 16 is configured of three sensors in order to detect acceleration in respective directions of the three axes orthogonal to one another. Considering that each of the three sensors is as small as about several mm in size, and the sensor measures the state of the mobile phone 1 such as "moving", "intensely moving", or "falling", it is required as the measuring performance to have a measuring interval of several tens meter per second or more (several hundreds Hz or more), and a measuring range of ±2 g to ten-odd g (g indicates acceleration of gravity). As such, the acceleration sensor 16 is preferably an MEMS (micro electro mechanical systems) sensor.

The main controller 11 includes a used state determination unit 112 which determines the used state of the mobile phone 1 according to the detection result by the cover open/close sensor 15 and the observed value by the acceleration sensor 16, a functional operation control unit 113 which sets operation settings of various functions 114 to an unusable state or maintains a usable state according to the determination result by the used state determination unit 112, and a functional state monitoring unit 115 which monitors whether each of the various functions 114 is in an unusable state or a usable state.

The various functions 114 include local applications and remote application execution functions to access application services provided by outside servers on the network. For example, the functions include: base functions incorporated in the mobile phone 1 such as an OS function, a calling function, a packet function, and an IC card function; local applications such as an e-mail function, an address book function, an image viewer function, and a noncontact ID card function used as electric money; and remote application execution functions such as a browser, an http/https communication program, ping, and Java (registered trademark) application.

An application service provided by an outside server can be used in such a manner that a unique ID is distributed to a user in advance, and user authentication is performed using the ID, and then the user of the terminal in a login state is authorized to use the service. The application services include a bulletin board service, a portal service, an SNS (Social Network Service), a blogging service, an image/picture viewing service, a goods selling service, an auction service, a database service, a service for providing paid content, and a service for trading valuable securities including stocks. Those services are generally configured such that when there is no continuous communications from the user, it is logout forcibly on a time limit base. Therefore, some services in which the viewing time tends to be longer, the convenience is hampered by the forced logout.

The memory 12 includes a sensor observed-value storing unit 121 which stores values observed by the cover open/close sensor 15 and by the acceleration sensor 16 together with time information, a state determination rule storing unit 122 which stores rules for corresponding values observed by the cover open/close sensor 15 and by the acceleration sensor 16 with classification of the used state of the mobile phone 1, a functional state information storing unit 123 which stores whether each of the various functions 114 is in an unusable state or in a usable state, and a functional control setting storing unit 124 which stores, for each of the various functions, methods to make each function unusable and to maintain a usable state, separately.

Although the functional operation control unit 113 in the main controller 11 sets any one of the various functions 114 to be unusable or maintains a usable state, for the base functions and local applications of the various functions 114, the functional operation control unit 113 sets them to be unusable by locking or maintains an unlocked state. Further, for the remote application execution function, the functional operation control unit 113 sets it to be in a logout state from a service or maintains a login state to a service.

Further, the functional operation control unit 113 authenticates user identification information such as password information which is input through operation by the user, and unlocks any of the various functions, having been set to be unusable, to be usable.

The used state determination unit 112 in the main controller 11 refers to the sensor observed value storing unit 121 at certain intervals, and estimates the state of the mobile phone 1 based on the physical quantity observed by the sensors 15 and 16 according to the rules stored in the state determination rule storing unit 122, and determines the state of the mobile phone 1 according to the estimation result. More specifically, the used state determination unit 112 classifies whether the state of the mobile phone 1 falls into "moving intensely", "moving slowly", "remaining stationary", or "falling", and determines the state in such a manner that if "moving intensely", the mobile phone 1 is "in an abnormal state", if "moving slowly", the mobile phone 1 is "not in an abnormal state and not left", if "remaining stationary", the mobile phone 1 is "left" or "not in an abnormal state and not left" while considering the conditions described later, and if "falling", the mobile phone 1 is "in an abnormal state".

If the used state determination unit 112 determines that the mobile phone 1 is "in an abnormal state" or "left", the used state determination unit 112 decides to set any of the various functions 114 to be "locked state/logout state", whereas if it determines that the mobile phone 1 is "not in an abnormal state and not left", the used state determination unit 112 assumes that the mobile phone 1 is "used normally" and decides to set any of the various functions 114 to be "unlocked state/maintaining login state". Then, the used state determination unit 112 records the decision into the function state information storing unit 123 and updates the information.

The rules stored in the state determination rule storing unit 122 include a rule based on statistical models and a rule based on a condition expression. A rule based on statistical models is a method in which statistical models of the observation results of the respective sensors when the mobile phone 1 is "in an abnormal state", "left", and "not in an abnormal state and not left" are set beforehand based on the previous observation results, and the respective models are checked against actual observation result, and the state shown by the model of the highest fitness is determined as the state of the mobile phone 1. In this case, the state determination rule storing unit 122 stores statistical models of the observation results of the respective sensors when the mobile phone 1 is in the aforementioned three states.

A rule based on a condition expression is a method of classifying observed values by the acceleration sensor 16 according to arithmetic processing and a threshold. Now, a determination rule based on a condition expression will be described.

Figure 2:
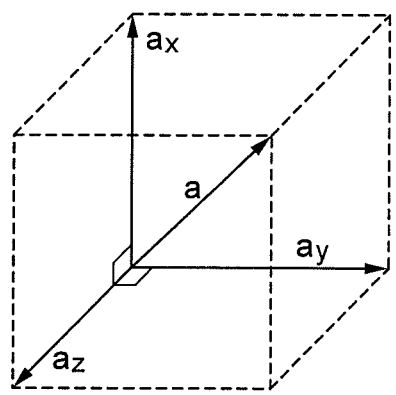
FIG. 2 shows a method of calculating the acceleration of the mobile phone 1 in the exemplary embodiment shown in FIG. 1.

First, as shown in FIG. 2, acceleration "a" of the mobile phone 1 is calculated by using Expression 1 where acceleration observed values of the respective three axes by the acceleration sensor 16 are $a_x$, $a_y$, and $a_z$.

$$a=\sqrt{(a_x)^2+(a_y)^2+(a_z)^2}$$

As the acceleration sensor 16 is affected by the gravity of the earth when the mobile phone 1 remains stationary, a=g (g is acceleration of gravity). When the mobile phone 1 is moving, "a" is an arbitrary value. When the mobile phone 1 is freely falling, a=0, but as there is a microgravity, a=α, where α is a constant showing acceleration of microgravity.

Further, it is assumed that the amount of change in the acceleration "a" in a unit time is a'. In other words, if it is assumed that a value observed at a time t is a(t), a' can be represented as a difference between a value a(k) which is observed at an arbitrary time k and a value a(k−1) which is observed at a previous time k−1, that is, a(k)−a(k−1).

When the mobile phone 1 remains stationary, a'=0, and when the mobile phone 1 is freely falling, a'=0. When the mobile phone 1 is moving, a'≠0. Particularly, when the mobile phone 1 is moving slowly, a'<=β (β is constant), and when the mobile phone 1 is moving intensely, a'>β. In this case, β is a threshold, when the mobile phone 1 is moving, for determining whether the movement is slow or intense. The method of determining the value of β will be described later.

Accordingly, when a'=0 and a=g, the mobile phone 1 is classified as "remaining stationary", when a'=0 and a=α, the mobile phone 1 is classified as "falling", when 0<a'<=β, the mobile phone 1 is classified as "moving slowly", and when a'>β, the mobile phone 1 is classified as "moving intensely".

If the mobile phone 1 is classified as "falling", as it can be assumed that the mobile phone 1 is left from the use's hand, it is determined as "in an abnormal state". Further, if the mobile phone 1 is classified as "moving slowly", it is determined that the user who released the lock uses the mobile phone 1 in the scope of normal usage. As this state can be assumed that an authorized user uses the mobile phone in a normal way, or, in a particular case, the authorized user allows someone to have the mobile phone 1 and he/she uses the mobile phone 1 under the supervision of the authorized user, it is determined as "not in an abnormal state and not left".

If the mobile phone 1 is classified as "moving intensely", as it is assumed that the mobile phone 1 falls and hits the floor or the like and is shocked or the mobile phone 1 is illegally taken away, or in a particular case, an authorized user attempts to get it back while sensing that the mobile phone 1 might be used illegally by someone, or an authorized user using the mobile phone 1 is aware of the presence of someone and the user conceals the mobile phone 1 to prevent the mobile phone 1 from being peeked by him/her, it is determined as "in an abnormal state".

On the other hand, if the mobile phone 1 is classified as "remaining stationary", as it is assumed that the authorized user may use the mobile phone 1 while putting on the desk or the like temporarily, the observation information by the cover open/close sensor 15 is used together. As it can be assumed that the user has no intention to use when the cover is closed, it is determined as "being left", and when the cover opens, it can be assumed that the use intentionally puts the mobile phone 1 on and uses it, it is determined as "not in an abnormal state and not left".

Note that the value of β varies depending on the size and weight of the mobile phone 1 itself or habits of the user. As such, it is preferable that the value of the threshold β can be set arbitrary for each user.

For instance, it is preferable to ask the user to use the mobile phone 1 for a certain period in a normal state including walking while viewing the mobile phone 1, inputting characters while holding the mobile phone 1, stretching and bending the arm holding the mobile phone 1 in a normal speed, and holding and moving freely in a normal speed, and then to set the maximum value of a' within the period to be β.

In the case of the determination rule based on the condition expression, the state determination rule storing unit 122 stores the threshold β. As such, since there is no need to store statistical models for every used state unlike the rule using the statistical models, the storage capacity of the state determination rule storing unit 122 may be relatively small.

In the information stored in the functional state information storing unit 123 shown in FIG. 1, various functions 114 are listed as indicated in the example shown in FIG. 3, in which the current operating state and the operation settings decided by the used state determination unit 112 are stored while being corresponded for each function. The current operational state of a function indicates the operational state at the current point of the various functions 114 of the control object monitored and managed by the functional state monitoring unit 115, indicating "unlocked state/login state" or "locked state/logout state". The operational setting determined by the used state determination unit 112 is "releasing lock/maintaining login state" or "locked state/making into logout state", and "-" in FIG. 3 indicates "locked state/logout state and there is nothing to do".

The functional operation control unit 113 periodically accesses the functional state information storing unit 123, and when there is a change in the information of the functional state information storing unit 123, the functional operation control unit 133 identifies a function to be controlled among the various functions 114, and acquires information regarding the function. In the example shown in FIG. 3, the information includes "maintaining the unlocked state" of the "OS function", and "making into locked state" of the "IC card function". Then, by checking the acquired information with the information of the functional control setting storing unit 124, the functional operation control unit 113 controls the operation of the corresponding function among the various functions 114.

Further, as each of the various functions 114 operates differently so that their operations have to be managed, the functional control setting storing unit 124 stores methods of "releasing lock/maintaining login state" and methods of "locking/making into a logout state" for the respective functions of the various functions 114.

For base functions and local applications of the various functions 114, a method of "maintaining the unlocked state" is basically "doing nothing". In the case that the function is set to be locked if no operation is performed within a certain period of time, the method is "resetting the time". If the function to be controlled has a lock function, methods of "making into locked state" are "activating the lock function" and "making the lock function effective", and if the function does not have a lock function, the methods include "turning off the function" and "turning off the function and turning it on by password authentication". Further, some functions may be set to be locked partially. For example, in the calling function, it can be locked such that calling can be made only for designated telephone numbers.

A method of "maintaining the login state" and a method of "making into a logout state" with respect to the remote application execution function are set according to the authentication management patterns on the remote application side.

Figure 4:
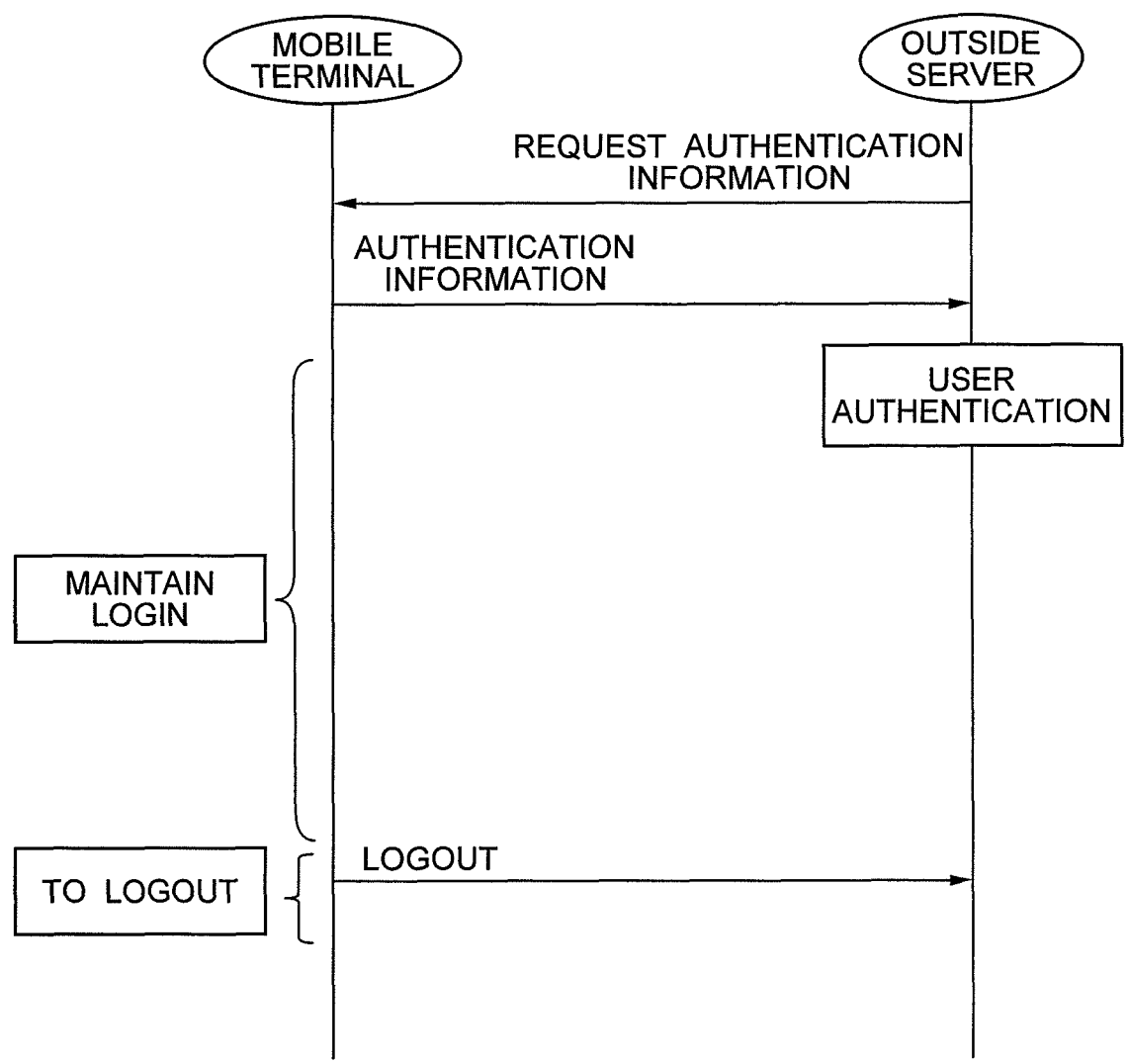
FIG. 4 shows an exemplary operation of a remote application executing function of the mobile phone 1 in the exemplary embodiment disclosed in FIG. 1.
Figure 5:
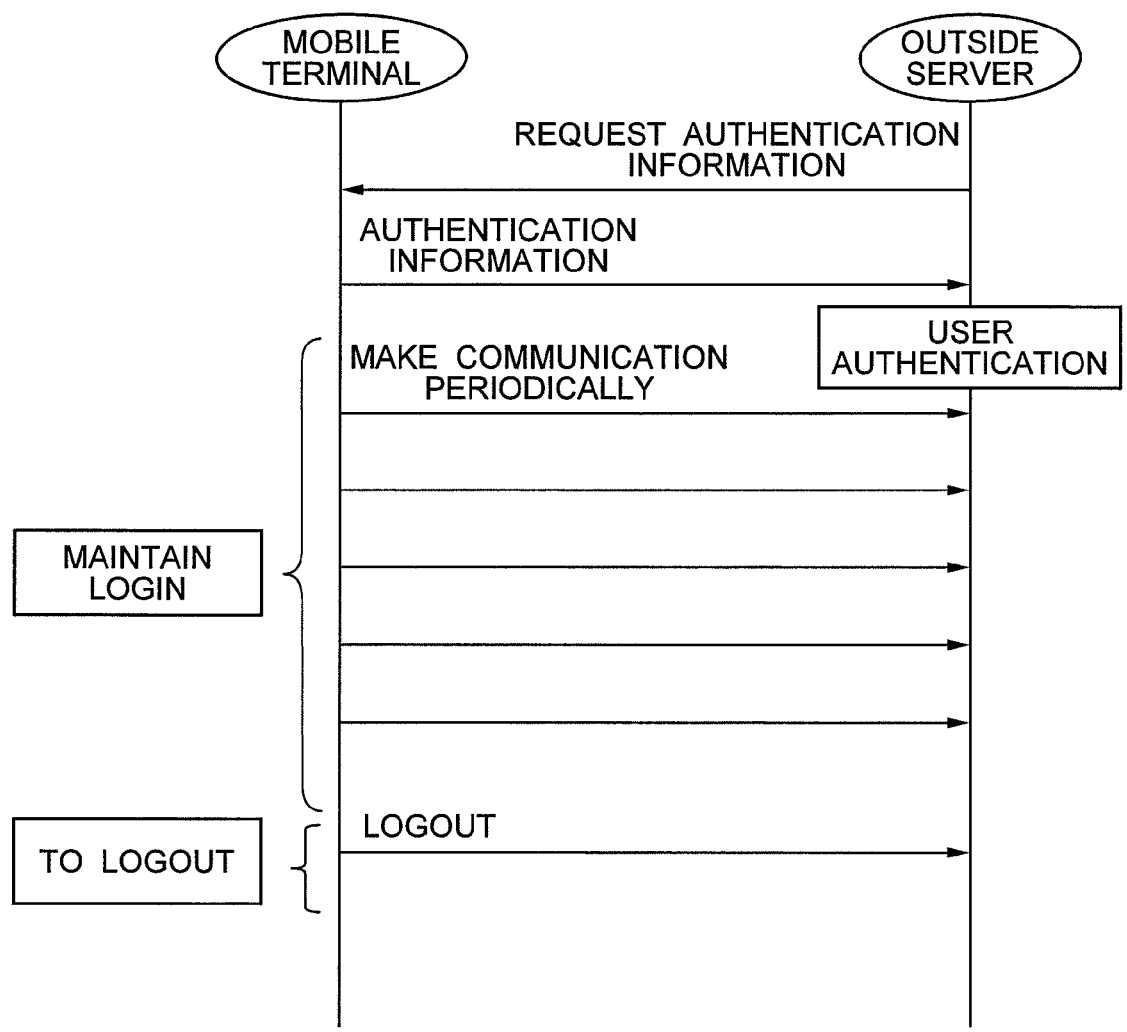
FIG. 5 shows another exemplary operation of the remote application executing function of the mobile phone 1 in the exemplary embodiment disclosed in FIG. 1.
Figure 6:
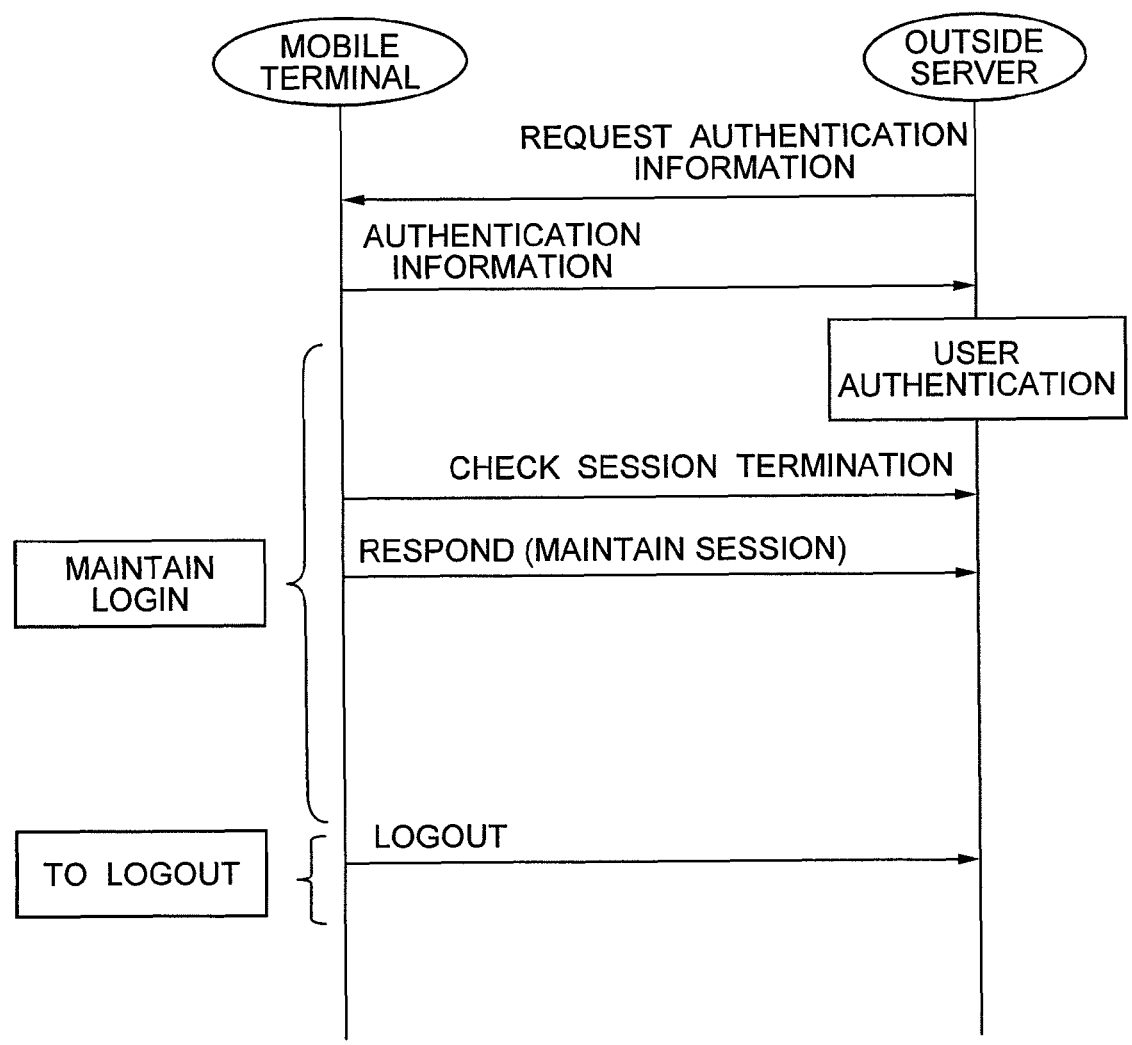
FIG. 6 shows another exemplary operation of the remote application executing function of the mobile phone 1 in the exemplary embodiment disclosed in FIG. 1.

For a function in which a login state is not terminated unless the authentication management pattern on the remote application side explicitly logs out, a method of "maintaining the login state" is "doing nothing", and a method of "making into a logout state" is "logging out" (see FIG. 4). However, for a function which is forcibly logged out if no communication is performed within a certain period of time, a method of "maintaining the login state" is to perform a specific communication processing such as "making communications periodically", and a method of "making into a logout state" is "logging out" (see FIG. 5). Further, for a function in which an inquiry is made to the terminal side to ask logout if there is no communication within a certain period of time, a method of "maintaining the login state" is to perform specific communication processing such as "responding to the inquiry", and a method of "making into a logout state" is "logging out" (see FIG. 6). Note that "making communications periodically" means making communications required for maintaining the login state to the application service on the network periodically.

Now, the remote application execution function will be described for the case of being executed with a browser and the case of being executed by java application.

Figure 8:
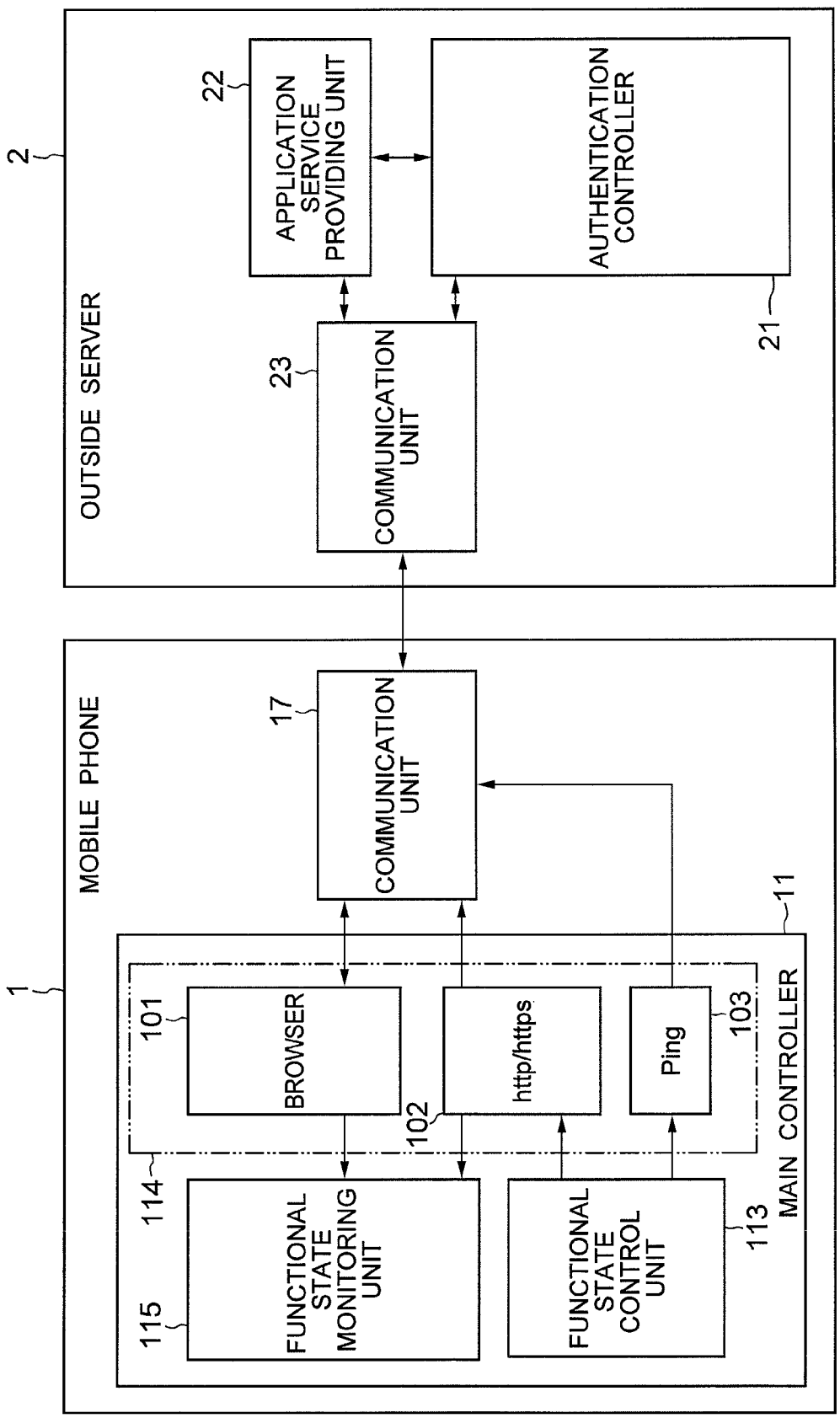
FIG. 8 shows another exemplary operation of the remote application executing function of the mobile phone 1 in the exemplary embodiment disclosed in FIG. 1.

First, in the case of using a browser, an access to the authentication controller 21 of the outside server 2 is performed using the browser 101 to perform user authentication, and login is made to a service, as shown in FIG. 8. Then, the service is provided from the application providing unit 21 of the outside server 2 to the browser 101. The browser 101 notifies the functional state monitoring unit 115 that the login has been made to the service on the network, and the functional state monitoring unit 115 updates the information stored in the functional state information storing unit 123 according to the notification.

Based on the information stored in the functional state information storing unit 123, the functional operation control unit 113 instructs to an http/https communication program 102 or ping 103 in accordance with the information stored in the functional control setting storing unit 124. If the information stored in the functional state information storing unit 123 indicates "turning into a logout state", an invalidation request of user authorization is transmitted to the authentication controller 21 of the outside server 2 by the http/https communication program 102, and the function is logged out from the service. The browser 101 notifies the functional state monitoring unit 115 whether or not the function is logged out from the service, and according to the notification, the functional state monitoring unit 115 updates the information stored in the functional state information storing nit 123. This is also the case when logout is performed with the browser 101 by the user's operation, or when the browser 101 is exited.

Figure 9:
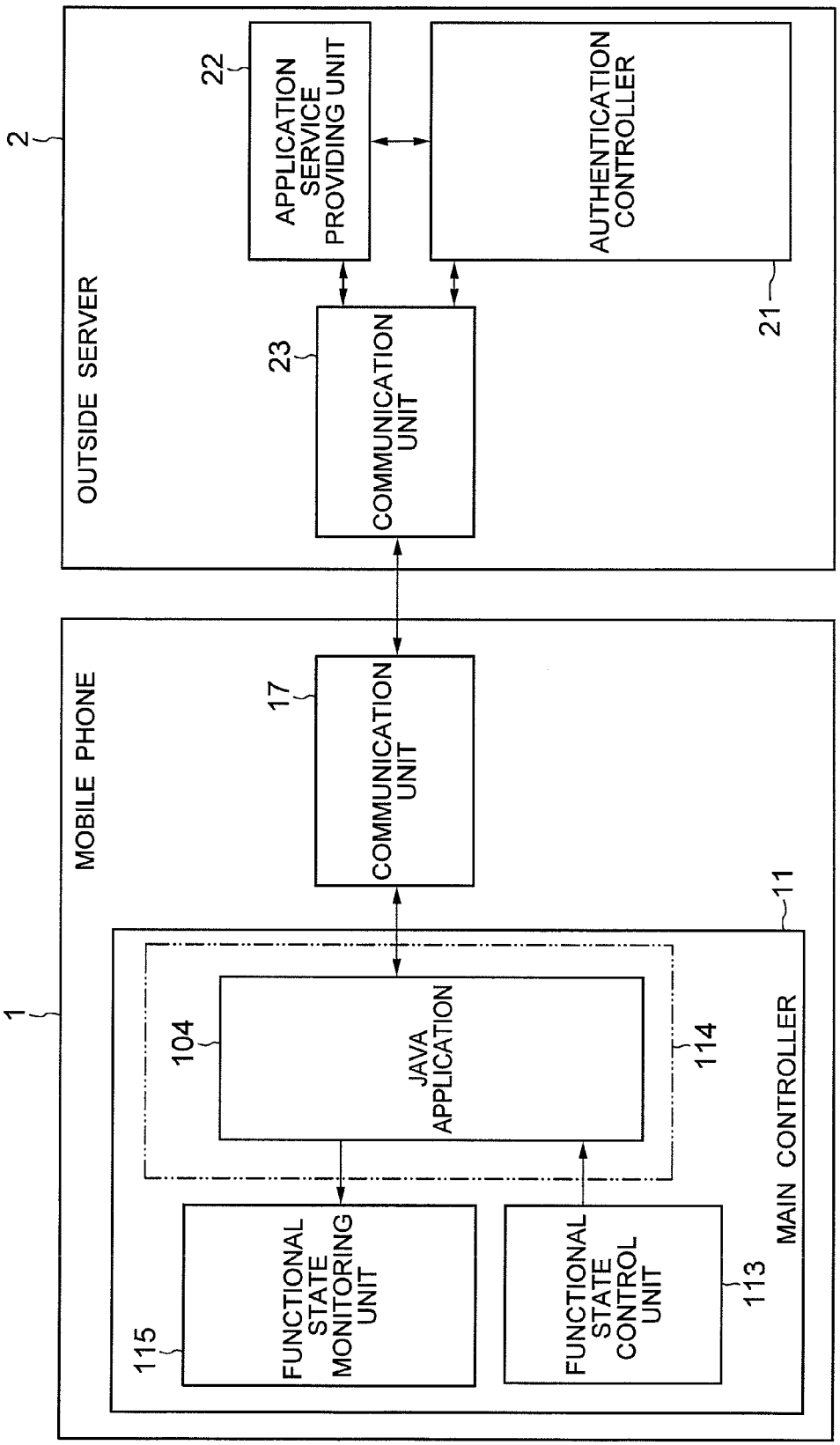
FIG. 9 shows another exemplary operation of the remote application executing function of the mobile phone 1 in the exemplary embodiment disclosed in FIG. 1.

Next, in the case of using the Java application 104, an access is made to the authentication controller 21 of the outside server 2 using the downloaded Java application 104 to execute user authentication, and login is made to a service, as shown in FIG. 9. Then, the service is provided from the application provider 21 of the outside server 2 to the Java application 104, so that the service on the network can be received by the Java application. The Java application notifies the functional state monitoring unit 115 that a login has been made to the service on the network, and according to the notification, the functional state monitoring unit 115 updates the information stored in the functional state information storing unit 123.

Based on the information stored in the functional state information storing unit 123, the functional operation control unit 113 gives an instruction to the Java application 104 in accordance with the information stored in the functional control setting storing unit 124. If the information stored in the functional state information storing unit 123 indicates "turning into a logout state", the Java application 104 transmits an invalidation request of user authentication to the authentication controller 21 of the outside server 2, so that the function is logged out from the service. The browser 101 notifies the functional state monitoring unit 115 whether or not the function is logged out from the service, and according to the notification, the functional state monitoring unit 115 updates the information stored in the functional state information storing unit 123. This is also the case when logout is made using the Java application by the user's operation, or when the Java application 104 is exited.

As described above, the remote application execution function for executing applications on the network include the case of performing on the browser 101 and the case of performing on the Java application 104, which may depend on the remote application. As such, some specific examples of "making communications periodically", which are methods of "maintaining the login state", are provided as shown in FIG. 7.

A method of "making communications periodically" for an application service with which a function is forcibly logged out if there is no communication within a predetermined period at the network level from the client is to execute ping periodically to the outside server 2, and transmit packets for analysis to the outside server 2 using ICMP (Internet Control Message Protocol) to thereby maintain the login state. Note that the network level in the exemplary embodiment means the third layer (Internet layer) in the TCP/IP protocol. The IP address of the outside server 2 which is the destination of executing ping is stored in the functional control setting storing unit 124.

For an application service in which logout is forcibly made when there is no communication within a predetermined period at http/https level from the client, a method of "making communications periodically" means a communication method in which URL (Unified Resource Locator) of the page designated for maintaining the authentication in the service is stored in the functional control setting storing unit 124, and the login state is maintained by periodically accessing to the URL at predetermined time intervals. Note that, in the exemplary embodiment, the http/https level indicates a communication method which can be implemented only by the http/https protocol.

For an application service in which a function is forcibly logged out when there is no communication within a predetermined period at the Java application level from the client, a method of "making communications periodically" is to download the Java application for performing network service, and the functional operation control unit 113 gives an instruction to control authentication through API of the Java application to thereby maintain the login state. The java application is implemented with an arbitrary communication method to control authentication. Note that, in the exemplary embodiment, the Java application level indicates a communication method which cannot be implemented only by the http/https protocol, and indicates any communication method which is implemented by the Java application.

FIG. 10 is a table showing exemplary operational settings for each of the aforementioned various functions 114.

Although the main controller, including the used state determination unit 112, the functional operation control unit 113, the functional state monitoring unit 115, and the various functions 114, is configured as hardware, it is not limited to this configuration and may be configured as software. In other words, the processing contents (functions) executed by the used state determination unit 112, the functional operation control unit 113, the functional state monitoring unit 115, and the various functions 114, may be programmed so as to be executed by a computer.

Next, operation of the mobile phone 1 of the exemplary embodiment will be described. Further, a method of preventing unauthorized use is also described by showing respective steps.

Figure 11:
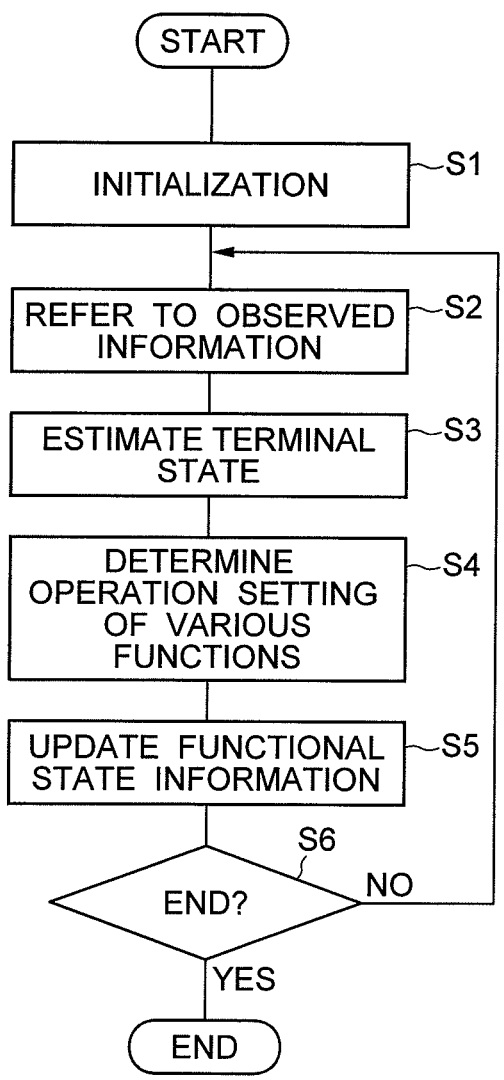
FIG. 11 is a flowchart showing operation of a used state determination unit of the mobile phone 1 disclosed in FIG. 1.
Figure 12:
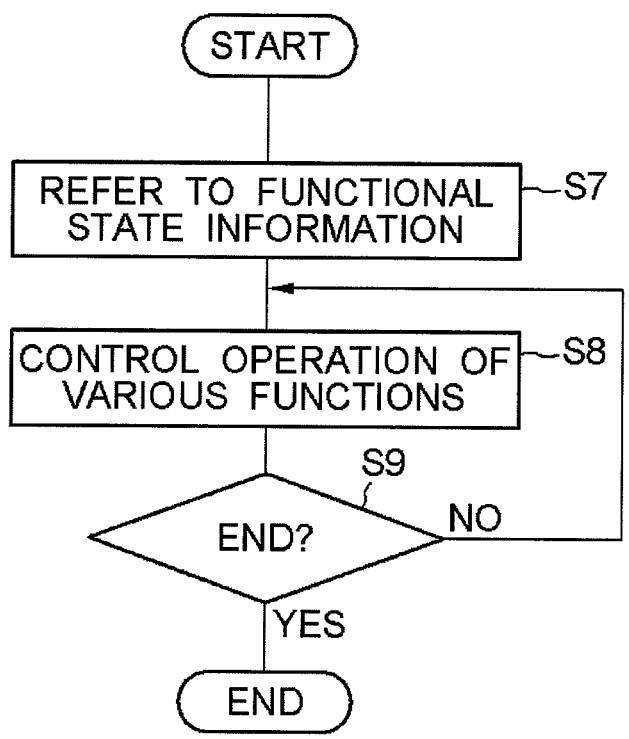
FIG. 12 is a flowchart showing operation of a functional operation control unit of the mobile phone 1 disclosed in FIG. 1.

FIG. 11 is a flowchart showing operation of the used state determination unit 112 in the mobile phone 1 of the exemplary embodiment. FIG. 12 is a flowchart showing operation of the functional operation control unit 113 in the mobile phone 1 of the exemplary embodiment.

When the locked state of any of the various functions 114 is unlocked or when login is made to a network service by the user's operation, the functional state monitoring unit 115 receives such information and updates the information stored in the functional state information storing unit 123. Then, the used state determination unit 122 detects the update, and performs an initialization process (FIG. 11, step S1). The initialization process includes activation of the acceleration sensor 16 and clearance of values of variables.

The observed value by the acceleration sensor 16 is stored in the sensor observed value storing unit 121 with the time information (element change observation step). The observed value which is observed in the latest certain time period (several minutes) is recorded in the sensor observed value storing unit 121. In the sensor observed value storing unit 121, the latest observed value by the acceleration sensor 16 is added and recorded, and the past records for which a predetermined time has been passed are being deleted.

After the initialization process, the used state determination unit 112 accesses the sensor observed value storing unit 121 and refers to the observation information (FIG. 11, step S2). Then, the used state determination unit 112 classifies the used state of the mobile phone 1 whether it is "moving intensely", "moving slowly", "remaining stationary", and "falling" by checking the observation information in light of the rule information in the state determination rule storing unit 122, and determines such that if the mobile phone 1 is "moving intensely", it is "in an abnormal state", if it is "moving slowly", it is "not in an abnormal state and not left", if it "remains stationary", it is "left" or "not in an abnormal state and not left" while also considering the observation information by the cover open/close sensor 15, and if it is "falling", it is "in an abnormal state" (FIG. 11: step S3, used state determination step). According to the determination result, the used state determination unit 112 determines whether the operation setting of each of the various functions 144 is set to be "releasing lock/maintaining login state" or "locked state/turning into a logout state" (FIG. 11: step S4), and records the determination into the function state information storing unit 123 and updates the information (FIG. 11: step S5). Then, the used state determination unit 112 refers to the observation information, and repeats the operation from referring to the observation information to writing of the determination result until the process ends.

Then, when the information in the functional state information storing unit 123 is updated, the functional operation control unit 113 refers to the information in the functional state information storing unit 123 (FIG. 12: step S7), and according to the information, the functional operation control unit 113 gives, to any of the various functions 114, an instruction based on the information stored in the functional control setting storing unit 124 to control the operation of the various functions 114 (FIG. 12: step S8, functional operation control step). For example, in the case of instructing a periodical operation such as executing ping at x-minute intervals, the instruction is repeated at x-minute intervals.

When the functional state monitoring unit 115 updates the functional state information storing unit 123, if it detects that all of the various functions 114 are in "locked state" or "logout state", the functional state monitoring unit 115 performs a concluding process. The concluding process includes releasing or resetting of used resources and halting the acceleration sensor 16.

As described above, according to the mobile phone 1 of the exemplary embodiment, the used state of the mobile phone 1 is determined based on the observation information by the acceleration sensor 16, and if it is determined that the mobile phone 1 is not in an abnormal state and is not left, an operation control to maintain the unlocked state or login state of the mobile phone 1 is automatically performed. As such, it is possible to prevent the mobile phone 1 from being automatically set to an unusable state during the time when the user is expected to hold the mobile phone 1, which will not prevent free operation of the mobile phone 1 by the user.

Further, if the mobile phone 1 is fallen or taken away illegally, it is possible to immediately activate the lock function so as to completely prevent unauthorized use of the mobile phone by a third party. Furthermore, if the authorized user senses that someone other than the authorized user attempts to use the mobile phone 1, it is possible to activate the lock function intuitively and immediately, which can completely prevent use of the mobile phone by someone who is not permitted by the authorized user.

Further, according to the mobile phone 1 of the exemplary embodiment, unauthorized use can also be prevented regarding use of application services on the network.

Although the mobile phone 1 of the exemplary embodiment is configured to include the cover open/close sensor 15 and the acceleration sensor 16, the present invention is not limited to this configuration, and may have a configuration including any one of an input device, a temperature sensor, a contact sensor, a light sensor, an electric resistance sensor, a tilt sensor, a power supply sensor, and a GPS sensor, provided that it has a sensor for observing the amount of changes in an element which changes corresponding to the state of the self device.

An input device is generally a keyboard including number keys and function keys. It also includes a dial-type selection device for selecting a function of a terminal, or a device including a switch key disposed on the side of the mobile phone 1. It is determined whether any of these devices is pressed.

A temperature sensor takes the temperature of the user touching the mobile phone 1 to detect whether the authorized user holds the mobile phone 1 in hand or in a pocket of the clothes that he/she is wearing. A contact sensor measures the grip strength of the user holding the mobile phone 1 to thereby detect whether the authorized user holds the mobile phone 1.

A light sensor observes whether a predetermined part of the mobile phone 1 is concealed to thereby detect whether or not the user holds the mobile phone 1 in hand. An electric resistance sensor observes the electric resistance of the skin of the hand touching the mobile phone 1 to thereby detect whether or not the user holds the mobile phone 1 in hand.

A tilt sensor observes changes in tilt of the mobile phone 1 to thereby detect whether or not the mobile phone 1 moves. A power source sensor detects whether or not the mobile phone 1 is connected to the power source.

A GPS sensor detects the position of the mobile phone. With this sensor, it can be determined whether the user is at home, in the office, or in the school. Further, as the speed of movement of the mobile phone 1 can also be observed by detecting the changes of the position, it can also be determined that the user is on a train or walking.

With a plurality of sensors of these kinds being installed in the mobile phone, as more pieces of information which can be used to determine the intention of the user are acquired, it is possible to realize prevention of unauthorized use and convenience together, with higher accuracy.

Further, the mobile phone 1 of the exemplary embodiment is capable of performing a lock function corresponding to a specific action by the user. For example, by storing observed values by the acceleration sensor 16 into the state determination rule storing unit 122 beforehand with respect to the actions such as largely shake the mobile phone 1 twice, largely shake it three times, and twirling it, the respective states can be classified. Thereby, a terminal operational function can be provided by an intuitive action by the user such that a predetermined function will be locked when the user largely shakes the mobile phone twice, and another function will be locked when the user largely shakes it three times.

Furthermore, the mobile phone 1 of the exemplary embodiment may be used as an authentication device for wireless authentication of another device. Wireless authentication is configured such that a mobile terminal authenticates the user as an authorized user, and the mobile terminal automatically makes the user to be an authorized user with respect to an item requiring authentication within several meters around by using near-distance communications such as Bluetooth (IEEE802.15.1) and wireless LAN (IEEE802.11 standards). With this function, if the user holds a mobile terminal having a wireless authentication function, he/she can use items located within several meters around without respective user authentication. Items requiring authentication include personal computers, cars, and door lock of a house.

This technique is called SPC (Secure Private Cosm), which is disclosed in Japanese Patent Laid-Open Publication No.

11-088499 and Japanese Patent Publication No. 2931276 as traditional art. This traditional art improves convenience of the user because a device held by the user automatically authenticate the nearby object requiring authentication, and also enhances the security because the nearby device becomes unusable automatically when the mobile phone moves away from it. However, in the case that the authorized mobile device is taken illegally, the other device becomes also usable illegally, so that the damage will be enormous. In view of this problem, the mobile phone 1 of the exemplary embodiment can improve the security because it is possible to invalidate the authentication when the mobile phone 1 is taken illegally.

As an exemplary advantage according to the invention, operational settings of the various functions of a mobile terminal are remain usable when the mobile terminal appears to be used continuously by an authorized user, and it is possible to prevent the various functions of the mobile terminal from being turned into unusable automatically when the user continuously uses the terminal. As such, the user can use the mobile terminal without any botheration.

Further, a mobile terminal according to another exemplary embodiment of the invention may be a terminal having a functional operation control unit which makes operational settings of various functions of the mobile terminal to be unusable at a predetermined timing. The mobile terminal includes a sensor which observes an amount of change in an element which changes according to a state of the mobile terminal, and a used state determination unit which determines the used state of the mobile terminal according to the observation result by the sensor. When the used state determination unit determines that the mobile terminal is not in an abnormal state, the functional operation control unit controls the operation of the various functions which are set to be usable to maintain the usable state.

In the mobile terminal, if the used state determination unit determines that the mobile terminal is not in an abnormal state and is not left, the functional operation control unit may control the operations of the various functions, which are set to be usable, to maintain the usable states.

The mobile terminal may have a remote application execution function, as one of the various functions, which accesses an application service provided by an outside server, and the functional operation control unit may control the operation of the remote application execution function to execute specific communication processing with respect to the outside server in order to maintain the login state to the application service which is a usable state for the remote application execution function.

In the mobile terminal, the functional operation control unit may control the operation of the remote application execution function to periodically execute ping, which is a command for checking the connecting state, with respect to the outside server in order to maintain the login state to the application service.

In the mobile terminal, the functional operation control unit may control the operation of the remote application execution function to periodically access the URL of a service page provided by the outside server in order to maintain the login state to the application service.

In the mobile terminal, the functional operation control unit may control the operation of the remote application execution function to immediately respond to a logout inquiry from the outside server in order to maintain the login state to the application service.

In the mobile terminal, when the used state determination unit determines that the mobile terminal is in an abnormal state, the functional operation control unit may make the operational settings of the various functions to be unusable.

In the mobile terminal, when the used state determination unit determines that the mobile terminal is being left, the functional operation control unit may make the operational setting of the various functions to be unusable.

In the mobile terminal, the used state determination unit may determine the used state of the mobile terminal as one of the three states including an abnormal state, a left state, and another state based on an observed value by the sensor.

In the mobile terminal, the used state determination unit may compare a statistical model of the observed value by the sensor, which has been set beforehand corresponding to the used state of the mobile phone, with the actual observation result by the sensor, and determine the state shown by the model having the highest fitness as the used state of the mobile terminal.

In the mobile terminal, the used state determination unit may determine the used state of the mobile terminal based on a predetermined threshold and an actual observation result by the sensor.

In the mobile terminal, the sensor may be an acceleration sensor which detects motion acceleration in three-dimensional directions.

In the mobile terminal, the sensor may be the acceleration sensor detecting motion acceleration in three-dimensional directions and a cover open/close sensor which detects open and close of a cover protecting the keys, and the used state determination unit may determine the used state of the mobile terminal according to a combination of an observed value by the acceleration sensor and a detection result by the cover open/close sensor.

An application providing system according to another exemplary embodiment includes a server which provides an application service, and a mobile terminal having a remote application execution function which accesses the server and transmits user identification information for logging into the application service. The server includes an authentication controller which receives user identification information from the mobile terminal and executes user authentication, and an application service providing unit which authorizes login to the application service of the authorized mobile terminal. The mobile terminal includes a sensor which observes an amount of change in an element which changes corresponding to the state of the mobile terminal, a used state determination unit which determines a used state of the mobile terminal according to the observation result by the sensor, and a functional operation control unit which controls operation of the remote application execution function according to the used state of the mobile terminal which is the determination result by the used state determination unit. When the used state determination unit determines that the mobile terminal is not in an abnormal state, the functional operation control unit of the mobile terminal may maintain the login state to the application service.

In the application providing system, in order to maintain the login state to the application service, the functional operation control unit of the mobile terminal may control the operation of the remote application execution function to execute specific communication processing to the server.

In the application providing system, in order to maintain the login state to the application service, the functional operation control unit of the mobile terminal may control operation of the remote application execution function to periodically perform ping, which is a command for checking the connecting state, to the server.

In the application providing system, in order to maintain the login state to the application service, the functional operation control unit of the mobile terminal may control operation of the remote application execution function to periodically access the URL of a service page provided by the server.

In the application providing system, in order to maintain the login state to the application service, the functional operation control unit of the mobile terminal may control operation of the remote application execution function to immediately respond to a logout inquiry from the server.

In the application providing system, when the used state determination unit determines that the mobile terminal is in an abnormal state, the functional operation control unit of the mobile terminal may forcibly log out from the application service.

In the application providing system, when the used state determination unit determines that the mobile terminal is being left, the functional operation control unit of the mobile terminal may forcibly log out from the application service.

In the application providing system, the used state determination unit of the mobile terminal may determine the used state of the mobile terminal as one of three states including an abnormal state, a left state, and another state.

In the application providing system, the used state determination unit of the mobile terminal may compare a statistical model of an observed value by the sensor which is predetermined corresponding to a used state of the mobile terminal with the actual observation result by the sensor, and determine the state shown by a model of the highest fitness as the used state of the mobile terminal.

In the application providing system, the used state determination unit of the mobile terminal may determine the used state of the mobile terminal according to a predetermined threshold and the actual observation result by the sensor.

In the application providing system, the sensor in the mobile terminal may be an acceleration sensor which detects motion acceleration in three-dimensional directions.

In the application providing system, the sensor in the mobile terminal may be the acceleration sensor detecting the motion acceleration of three-dimensional directions and a cover open/close sensor which detects open and close of a cover protecting the keys, and the used state determination unit may determine the used state of the mobile terminal by a combination of an observed value by the acceleration sensor and the detection result by the cover open/close sensor.

A method of preventing unauthorized use according to another exemplary embodiment of the invention is a method which sets various functions of a mobile terminal to be unusable at any timing. The method may include an element change observation step for monitoring an element which changes corresponding to a state of the mobile terminal and observes the amount of change, a used state determination step for determining a used state of the mobile terminal according to the observation result in the element change observation step, and a functional operation control step for controlling, when the mobile terminal is determined as not being in an abnormal state in the used state determination step, operation of the various functions having been set to be usable to maintain the usable state.

In the method of preventing unauthorized use, when the mobile terminal is determined as not being in an abnormal state and not being left in the used state determination step, the functional operation control step may be configured as to control the operation of the various functions having been set to be usable to maintain the usable state.

In the method of preventing unauthorized use, the functional operation control step may be configured as to control operation of the remote application execution function of accessing an application service provided by an outside server to execute specific communication processing with respect to the outside server in order to maintain a login state to the application service which is a usable state for the remote application execution function.

In the method of preventing unauthorized use, the functional operation control step may be configured as to control operation of the remote application execution function to execute ping which is a command for checking a connecting state, in order to maintain the login state to the application service.

In the method of preventing unauthorized use, the functional operation control step may be configured as to control operation of the remote application execution function to periodically access the URL of a service page provided by the outside server in order to maintain the login state to the application service.

In the method of preventing unauthorized use, the functional operation control step may be configured as to control operation of the remote application execution function to immediately respond to a logout inquiry from the outside server in order to maintain the login state to the application service.

In the method of preventing unauthorized use, the functional operation control step may be configured as to set the various functions to be unusable when the mobile terminal is determined as being in an abnormal state in the used state determination step.

In the method of preventing unauthorized use, the functional operation control step may be configured as to set the various functions to be unusable when the mobile terminal is determined as being left in the used state determination step.

In the method of preventing unauthorized use, the used state determination step may be configured as to determine the used state of the mobile terminal as one of an abnormal state, a left state, and another state.

In the method of preventing unauthorized use, the used state determination step may be configured as to compare a statistical model of the observation result which is predetermined corresponding to a used state of the mobile terminal with the actual observation result of a change in the environmental element, and determine the state shown by a model of the highest fitness as the used state.

In the method of preventing unauthorized use, the used state determination step may be configured as to determine the used state of the mobile terminal according to a predetermined threshold and an actual observation result of a change in the environmental element.

In the method of preventing unauthorized use, the element change observation step may be configured as to observe a change in motion acceleration in three-dimensional directions.

In the method of preventing unauthorized use, the element change observation step may be configured as to observe a change in motion acceleration in three-dimensional directions and detect open and close of a cover protecting the keys, and the used state determination step may be configured as to determine the used state of the mobile terminal by a combination of the observed value of the change in motion acceleration and the open/close of the cover.

Further, a program for preventing unauthorized use according to another exemplary embodiment of the invention is a program which causes a computer to execute a functional operation controlling process which makes operational settings of various functions of a mobile terminal to be unusable at any timing. The program causes the computer to execute an observed value acquiring process to monitor an element which changes corresponding to a state of the mobile terminal and to acquire the observation result from a sensor which observes the amount of change, and a used state determination process to determine a used state of the mobile terminal according to the observation result acquired, and when the mobile terminal is determined as not being in an abnormal state in the used state determining process, the program causes the computer to execute the functional operation controlling process while limiting the process to control operation of the various functions being set to be usable to maintain the usable state.

In the program for preventing unauthorized use, the functional operation controlling process may be limited to a process of causing the computer to control operation of the various functions being set to be usable to maintain the usable state when the mobile terminal is determined as not being in an abnormal state and not being left in the used state determining process.

In the program for preventing unauthorized use, the functional operation controlling process may be limited to a process of controlling operation of the remote application execution function to execute specific communication processing with the outside server, in order to maintain a login state to an application service which is in a usable state for the remote application execution function accessing the application service provided by an outside server.

In the program for preventing unauthorized use, the functional operation controlling process may be limited to a process of controlling operation of the remote application execution function to periodically perform ping which is a command for checking the connecting state to the outside server in order to maintain the login state to the application service.

In the program for preventing unauthorized use, the functional operation controlling process may be limited to a process of controlling operation of the remote application execution function to periodically access the URL of a service page provided by the outside server in order to maintain the login state to the application service.

In the program for preventing unauthorized use, the functional operation controlling process may be limited to a process of controlling operation of the remote application execution function to immediately respond to a logout inquiry from the outside server in order to maintain a login state to the application service.

In the program for preventing unauthorized use, the functional operation controlling process may be limited to a process of setting the various functions to be unusable when the mobile terminal is determined to be in an abnormal state in the used state determination process.

In the program for preventing unauthorized use, the functional operation controlling process may be limited to a process of setting the various functions to be unusable when the mobile terminal is determined as being left in the used state determination process.

In the program for preventing unauthorized use, the used state determination process may be limited to a process of determining the used state of the mobile terminal as one of three states including an abnormal state, a left state, and another state.

In the program for preventing unauthorized use, the used state determination process may be limited to a process of comparing a statistical model of an observation result by the sensor which has been set corresponding to the used state of the mobile terminal with the actual observation result by the sensor, and determining the state shown by a model of the highest fitness as the used state of the mobile terminal.

In the program for preventing unauthorized use, the used state determination process may be limited to a process of determining the used state of the mobile terminal according to a predetermined threshold and an actual observation result by the sensor.

In the program for preventing unauthorized use, the observed value acquiring process may be limited to a process of acquiring an observed value by an acceleration sensor which observes a change in motion acceleration in three-dimensional directions.

In the program for preventing unauthorized use, the observed value acquiring process may be limited to a process of acquiring an observed value by an acceleration sensor which observes a change in motion acceleration in three-dimensional directions and the detection result by a cover open/close sensor which detects open and close of the cover protecting the keys, and the used state determination process may be limited to a process of determining the used state of the mobile terminal by a combination of the observed value of the acceleration and the open/close state of the cover.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile terminal having a functional operation control unit which locks operations of various functions of the mobile terminal if no operation is performed within a certain period of time set in advance, at a timing when the certain period of time has elapsed, and sets the functions to be in an unusable state, the mobile terminal comprising:
    an acceleration sensor, configured with three sensors, for measuring acceleration observed values of orthogonal, respective three axes and observing three states including an abnormal state, a left state, and a normally used state as being neither of them based on the acceleration observed values of the respective three axes;
    a state determination rule storing unit for classifying the used state of the mobile terminal into the three states including the abnormal state where an amount of change in acceleration of the mobile terminal is equal to or more than a threshold, the left state, and the normally used state as being neither of them, and storing a state determination rule which determines a corresponding relation between the respective states and observed values by the acceleration sensor; and
    a used state determination unit for determining the used state of the mobile terminal as one of the three states based on the state of the mobile terminal observed by the acceleration sensor and the rule stored in the state determination rule storing unit, wherein
    when the mobile terminal is determined as being in the normally used state by the used state determination unit, the functional operation control unit performs setting control of the operation of the various functions having been set to be usable to maintain the usable state continuously even when the certain period of time has elapsed.

2. The mobile terminal, according to claim 1, having a remote application execution function as one of the functions, for logging into an application service provided by an outside server, wherein the functional operation control unit controls an operation of the remote application execution function to execute specific communication processing with respect to the outside server in order to maintain a login state to the application service which is the usable state for the remote application execution function.

3. The mobile terminal, according to claim 2, wherein the functional operation control unit controls the operation of the remote application execution function to periodically execute ping, which is a command for checking a connecting state, with respect to the outside server in order to maintain the login state to the application service, as the specific communication processing.

4. The mobile terminal, according to claim 2, wherein the functional operation control unit controls the operation of the remote application execution function to periodically access the URL of a service page provided by the outside server in order to maintain the login state to the application service, as the specific communication processing.

5. The mobile terminal, according to claim 2, wherein the functional operation control unit controls the operation of the remote application execution function to immediately respond to a logout inquiry from the outside server in order to maintain the login state to the application service, as the specific communication processing.

6. The mobile terminal, according to claim 1, wherein when the mobile terminal is determined as being in the abnormal state by the used state determination unit, the functional operation control unit forcibly sets the operations of the various functions to be in the unusable state, regardless of whether the certain period of time has elapsed.

7. The mobile terminal, according to claim 1, wherein when the mobile terminal is determined as being in the left state by the used state determination unit, the functional operation control unit forcibly sets the operations of the various functions to be in the unusable state, regardless of whether the certain period of time has elapsed.

8. The mobile terminal, according to claim 1, wherein the state determination rule storing unit stores, as the state determination rule, statistical models of the observed value by the sensor determined for the three states of the mobile terminal, and
the used state determination unit compares an actual observation result by the sensor with the respective models, and determines the state shown by the model having a highest fitness as the used state of the mobile terminal.

9. The mobile terminal, according to claim 1, wherein the state determination rule storing unit stores, as the state determination rule, a threshold of the observed values by the sensor for determining the used state of the mobile terminal, and
the used state determination unit determines the used state of the mobile terminal based on the actual observation result by the sensor and the threshold.

10. The mobile terminal, according to claim 1, wherein the sensor is an acceleration sensor which detects motion acceleration in three-dimensional directions.

11. The mobile terminal, according to claim 1, wherein an acceleration sensor which detects motion acceleration in three-dimensional directions and a cover open/close sensor which detects open and close of a cover protecting keys are used as the sensor, and
the used state determination unit determines the used state of the mobile terminal according to a combination of an observed value by the acceleration sensor and a detection result by the cover open/close sensor.

12. The mobile terminal according to claim 1, wherein, when a user uses the mobile terminal for a certain time period in a normal state, the threshold is a maximum value of the amount of change in acceleration of the mobile terminal within the certain time period.

13. An application providing system comprising a server which provides an application service and a mobile terminal which has a remote application execution function of accessing the server and transmits user identification information for logging into the application service, wherein:
the server comprises:
an authentication controller which receives user identification information from the mobile terminal and executes user authentication; and
an application service providing unit which authorizes a login to the application service of the mobile terminal authenticated by the authentication controller and sends an inquiry to the mobile terminal to ask a logout at a timing when a certain time period has elapsed if there is no communication from the mobile terminal, which authorized the login, within the certain period of time set in advance, and
the mobile terminal comprises:
a functional operation control unit for performing setting control of the operation of the remote application execution function to log out from the application service on receiving the inquiry from the server;
an acceleration sensor, configured with three sensors, for measuring acceleration observed values of orthogonal, respective three axes and observing three states including an abnormal state, a left state, and a normally used state as being neither of them based on the acceleration observed values of the respective three axes;
a state determination rule storing unit for classifying a used state of the mobile terminal into the three states including the abnormal state where an amount of change in acceleration of the mobile terminal is equal to or more than a threshold, the left state, and the normally used state as being neither of them, and storing a state determination rule which determines a corresponding relation between the respective states and observed values by the acceleration sensor; and
a used state determination unit for determining the used state of the mobile terminal as one of the three states based on the state of the mobile terminal observed by the acceleration sensor and the state determination rule stored in the state determination rule storing unit, wherein
when the mobile terminal is determined as being in a normally used state by the used state determination unit, the functional operation control unit of the mobile terminal outputs a command to perform setting control of the operation of the remote application execution function to maintain a login state continuously without logging out from the application service even when the certain time period has elapsed.

14. The application providing system, according to claim 13, wherein
the functional operation control unit of the mobile terminal controls the operation of the remote application execution function to execute specific communication processing with respect to the server in order to maintain the login state to the application service.

15. The application providing system, according to claim 14, wherein
the functional operation control unit of the mobile terminal controls the operation of the remote application execution function to periodically execute ping, which is a command for checking a connecting state, with respect to the server as the specific communication processing in order to maintain a login state to the application service.

16. The application providing system, according to claim 14, wherein
the functional operation control unit of the mobile terminal controls the operation of the remote application execution function to periodically access the URL of a service page provided by the server as the specific communication processing in order to maintain the login state to the application service.

17. The application providing system, according to claim 14, wherein
the functional operation control unit of the mobile terminal controls the operation of the remote application execution function to immediately respond to a logout inquiry from the server as the specific communication processing in order to maintain the login state to the application service.

18. The application providing system, according to claim 14, wherein
when the mobile terminal is determined as being in the abnormal state by the used state determination unit, the functional operation control unit of the mobile terminal forcibly controls the operation of the remote application execution function to log out from the application service, regardless of whether the certain period of time has elapsed.

19. The application providing system, according to claim 14, wherein
when the mobile terminal is determined as being in the left state by the used state determination unit, the functional operation control unit the mobile terminal forcibly control the operation of the remote application execution function to log out from the application service, regardless of whether the certain period of time has elapsed.

20. The application providing system according to claim 14, wherein, when a user uses the mobile terminal for a certain time period in a normal state, the threshold is a maximum value of the amount of change in acceleration of the mobile terminal within the certain time period.

21. A method of preventing unauthorized use of a mobile terminal having a functional operation control unit which locks operations of various functions of the mobile terminal if no operation is performed within a certain period of time arbitrarily set in advance, at a timing when the certain time period has elapsed, and setting the functions to be in an unusable state, the method comprising:
a measuring step in which an acceleration sensor, configured with three sensors, measures acceleration observed values of orthogonal, respective three axes and observing three states including an abnormal state, a left state, and a normally used state as being neither of them based on the acceleration observed values of the respective three axes;
a used state determination step in which a determination unit classifies a used state of the mobile terminal as one of the three states including the abnormal state where an amount of change in acceleration of the mobile terminal is equal to or more than a threshold, the left state, and the normally used state as being neither of them, based on the state of the mobile terminal observed by the acceleration sensor and a state determination rule set in advance, and
a functional operation control step in which, when the mobile terminal is determined as being in the normally used state, the functional operation control unit performs setting control of the operation of the various functions having been set to be usable to maintain the usable state continuously even when the certain time period has elapsed.

22. The method of preventing unauthorized use of a mobile terminal, according to claim 21, wherein
in the functional operation control step, the functional operation control unit controls the operation of the remote application execution function of accessing an application service provided by an outside server, which is one of the various functions, to execute specific communication processing with respect to an outside server in order to maintain a login state to the application service which is the usable state for the remote application execution function.

23. The method of preventing unauthorized use of a mobile terminal, according to claim 22, wherein
in the functional operation control step, the functional operation control unit controls the operation of the remote application execution function to periodically execute ping, which is a command for checking a connecting state, with respect to the outside server in order to maintain a login state to the application service, as the specific communication processing.

24. The method of preventing unauthorized use of a mobile terminal, according to claim 22, wherein
in the functional operation control step, the functional operation control unit controls the operation of the remote application execution function to periodically access the URL of a service page provided by the outside server in order to maintain the login state to the application service, as the specific communication processing.

25. The method of preventing unauthorized use of a mobile terminal, according to claim 22, wherein
in the functional operation control step, the functional operation control unit controls the operation of the remote application execution function to immediately respond to a logout inquiry from the outside server in order to maintain the login state to the application service, as the specific communication processing.

26. The method of preventing unauthorized use of a mobile terminal, according to claim 22, wherein
in the functional operation control step, when the mobile terminal is determined as being in the abnormal state in the used state determination step, the functional operation control unit forcibly sets the operation of the various functions having been set to be usable to be in the unusable state, regardless of whether the certain period of time has elapsed.

27. The method of preventing unauthorized use of a mobile terminal, according to claim 22, wherein
in the functional operation control step, when the mobile terminal is determined as being in the left state in the used state determination step, the functional operation control unit forcibly sets the operation of the various functions having been set to be usable to be in the unusable state, regardless of whether the certain period of time has elapsed.

28. The method of preventing authorized use of a mobile terminal according to claim 22, wherein, when a user uses the mobile terminal for a certain time period in a normal state, the threshold is a maximum value of the amount of change in acceleration of the mobile terminal within the certain time period.

29. A non-transitory computer readable recording medium storing a program for preventing unauthorized use of a mobile terminal, the program causing a computer to execute:

a functional operation control processing for locking operations of various functions of the mobile terminal if no operation is performed within a certain period of time arbitrarily set in advance, at a timing when the certain time period has elapsed, and setting the functions to be in an unusable state, an observed value obtaining processing in which an acceleration sensor, configured with three sensors, measures acceleration observed values of orthogonal, respective three axes and observing three states including an abnormal state, a left state, and a normally used state as being neither of them based on the acceleration observed values of the respective three axes;

a used state determination processing for classifying the used state of the mobile terminal into the three states including the abnormal state where an amount of change in acceleration of the mobile terminal is equal to or more than a threshold, the left state, and the normally used state as being neither of them, and determining the used state of the mobile terminal as one of the three states based on the state of the mobile terminal device observed by the acceleration sensor and a state determination rule set in advance, and a continuous maintenance control processing for, when the mobile terminal is determined as being in the normally used state by the used state determination processing, performing setting control of the operation of the various functions having been set to be usable to maintain the usable state continuously even when a certain period of time has elapsed.

30. The non-transitory computer readable recording medium storing the program for preventing unauthorized use of a mobile terminal, according to claim 29, the mobile terminal having a remote application execution function of accessing an application service provided by an outside server as one of the functions, the program causing a computer to execute, as the continuous maintenance control processing, a function of controlling the operation of the remote application execution function to execute specific communication processing with respect to the outside server in order to maintain a login state to the application service which is the usable state for the remote application execution function.

31. The non-transitory computer readable recording medium storing a program for preventing unauthorized use of a mobile terminal, according to claim 30, the program causing a computer to execute, as the continuous maintenance control processing, a function of controlling the operation of the remote application execution function to periodically execute ping, which is a command for checking a connecting state, with respect to the outside server in order to maintain a login state to the application service, as the specific communication processing.

32. The non-transitory computer readable recording medium storing a program for preventing unauthorized use of a mobile terminal, according to claim 30, the program causing a computer to execute, as the continuous maintenance control processing, a function of controlling the operation of the remote application execution function to periodically access the URL of a service page provided by the outside server in order to maintain the login state to the application service, as the specific communication processing.

33. The non-transitory computer readable recording medium storing a program for preventing unauthorized use of a mobile terminal, according to claim 30, the program causing a computer to execute, as the continuous maintenance control processing, a function of controlling the operation of the remote application execution function to immediately respond to a logout inquiry from the outside server in order to maintain the login state to the application service, as the specific communication processing.

34. The non-transitory computer readable recording medium storing a program for preventing unauthorized use of a mobile terminal, according to claim 29, the program causing a computer to execute, when the mobile terminal is determined as being in the abnormal state by the used state determination processing, a forcing control processing for forcibly setting the operation of the various functions having been set to be usable to be in the unusable state regardless of whether the certain period of time has elapsed.

35. The non-transitory computer readable recording medium storing a program for preventing unauthorized use of a mobile terminal, according to claim 29, the program causing a computer to execute, when the mobile terminal is determined as being in the left state by the used state determination processing, a forcing control processing for forcibly setting the operation of the various functions having been set to be usable to be in the unusable state regardless of whether the certain period of time has elapsed.

36. The non-transitory computer readable recording medium storing a program for preventing unauthorized use of a mobile terminal, according to claim 29, the program causing a computer to execute, as the used state determination processing, a function of comparing statistical models of the observation results by the sensor set in advance corresponding to the used state of the mobile terminal with an actual observation result by the sensor, and determining the state shown by the model having a highest fitness as the used state of the mobile terminal.

37. The non-transitory computer readable recording medium storing a program for preventing unauthorized use of a mobile terminal, according to claim 29, wherein, when a user uses the mobile terminal for a certain time period in a normal state, the threshold is a maximum value of the amount of change in acceleration of the mobile terminal within the certain time period.

* * * * *